United States Patent [19]
Motoyama et al.

[11] Patent Number: 6,109,223
[45] Date of Patent: Aug. 29, 2000

[54] OPERATING METHOD OF TWO STROKE DIRECT INJECTED ENGINE

[75] Inventors: Yu Motoyama; Hidehiro Nishimura; Kousei Maebashi, all of Iwata, Japan

[73] Assignee: Yamaha Hatsudoki Kabushiki Kaisha, Iwata, Japan

[21] Appl. No.: 09/377,449

[22] Filed: Aug. 19, 1999

[30] Foreign Application Priority Data

Aug. 19, 1998 [JP] Japan .................................. 10-232785

[51] Int. Cl.$^7$ .............................. F02B 33/04; F02D 41/30
[52] U.S. Cl. ........................................ 123/73 A; 123/73 C
[58] Field of Search ................................ 123/73 A, 73 C

[56] References Cited

U.S. PATENT DOCUMENTS 5,251,582  10/1993  Mochizuki .

FOREIGN PATENT DOCUMENTS 9-250429  9/1997  Japan .

Primary Examiner—Willis R. Wolfe
Assistant Examiner—Katrina B. Harris
Attorney, Agent, or Firm—Knobbe, Martens, Olson & Bear LLP

[57] ABSTRACT

A two cycle crankcase compression internal combustion engine wherein a single fuel injector is mounted in the cylinder block and can inject either directly into the combustion chamber or into the induction system through the crankcase chamber through a window in the piston. A control strategy is disclosed wherein the injection occurs primarily into the induction system during either or both of startup and low temperature.

11 Claims, 5 Drawing Sheets

OPERATING METHOD OF TWO STROKE DIRECT INJECTED ENGINE

BACKGROUND OF THE INVENTION

This invention relates to direct injected internal combustion engines and more particularly to an improved operational method and apparatus for a two stroke direct injected internal combustion engine.

In the interest of continuing to improve the performance of internal combustion engines both in terms of output as well as exhaust emission control and fuel economy, direct cylinder injection is quite favorable. However, there are some instances when direct injection may not operate as efficiently or as good as forms of manifold injection. Manifold injection being injection of the fuel into the intake system upstream of the combustion chamber. In addition, there are certain problems inherent in the use of direct injection which has resulted in reduced application of this principle.

One difficulty with direct injected engines is that the fuel injector is generally positioned so that it will be exposed to the combustion conditions in the combustion chamber, particularly at the initial time of firing and during initial, rapid flame propagation. This necessitates the use of very expensive components and also still gives rise to the possibility that the fuel injector may become contaminated.

It is, therefore, a principle object to this invention to provide an improved fuel injector arrangement for an internal combustion engine wherein direct injection can be enjoyed, but wherein the injector is protected from the initial phase of combustion thus permitting the use of lower cost and longer life injectors.

When direct injection is employed, it is also necessary that the injector be capable of injecting fuel at quite high pressures. This is because the injector is exposed in the combustion chamber and at least part of the injection cycle takes place when the mixture in the combustion chamber is relatively highly compressed. The use of high pressure injection systems, however, presents certain difficulties.

First, when high pressure injection is employed higher pressure pumps must be provided and regulation of pressure becomes more critical. Furthermore, the injection penetration can, at times, become greater than desired and result in deposition of more fuel than desired within the surfaces of the combustion chamber. This can result in plug fouling and other undesirable conditions.

It is, therefore, a still further object of this invention to provide an improved direct injected internal combustion engine wherein the injection can be controlled so as to avoid the necessity of spraying into high pressure areas and/or employing high pressure under all injection conditions.

Many of the problems which were noted previously and which will be discussed later are even more acute when the injection system is employed with a two cycle engine. With two cycle engines, the time at which direct cylinder injection can occur is quite limited due to the fact that the engine fires every revolution of the crankshaft rather than every other revolution as with a four cycle engine. This further exacerbates the problems already noted.

It is, therefore, a still further object of this invention to provide an improved injection system and method for a two cycle engine which permits direct cylinder injection without necessitating high pressures.

One particularly acute problem in connection with direct injection engines is during starting and particularly cold starting. Because of the low temperature of the engine and the fact that it is cranked relatively slowly during starting, it is generally necessary to provide a richer than normal mixture so as to ensure the existence of a stoichiometric fuel air mixture at the time ignition occurs.

If high pressure systems are employed, it takes time for the system to develop the high pressure, particularly when high pressure engine driven pumps are employed. Thus, the injector may not develop adequate pressure to sufficiently vaporize the fuel during starting.

It is, therefore, a still further object to this invention to provide an improved arrangement for starting a fuel injected engine wherein vaporization of the fuel can be improved during starting and high pressure generation is not required.

It has been previously noted that the problems attendant with direct injection are more acute in many instances with two cycle engines than four cycle engines. The starting conditions and also high speed high load operating conditions are such that it may not be possible to inject all of the fuel required for combustion under some running conditions if only direct injection is employed.

It is, therefore, a still further object to this invention to provide an improved injection systems for an engine wherein fuel may be injected directly into the combustion chamber under some running conditions and into the induction tract under other running conditions.

Although the goals mentioned in the preceding paragraph are obtainable if the system is provided with two fuel injectors, one directly injecting into the combustion chamber and the other injecting into the induction system, this further complicates the system. This is particularly true if the direct injection system need be a high pressure system and the manifold injection system is a low pressure system. This provides difficulties in having two different pressure regulating systems and also two different supply systems, one for each injector.

It is, therefore, a still further object of this invention to provide an improved arrangement for utilizing a single injector which can be operated in such a way so as to inject fuel into the induction system under some running conditions and directly into the combustion chamber under other running conditions.

With two cycle engines and those having only direct cylinder injection, at times the heat in the combustion chamber and particularly at the head of the piston can be too high. During normal crankcase compression engine operation and when utilizing fuel introduction into the crankcase or induction system that feeds the crankcase, there is some cooling of the underside of the piston due to fuel evaporation.

If only direct cylinder injection is employed, this cooling may be lost and thus it is a still further object to this invention to provide an improved injection system wherein fuel can be selectively injected by a single injector directly into the combustion chamber and/or into the induction system depending upon specific running conditions.

SUMMARY OF THE INVENTION

This invention is adapted to be embodied in an internal combustion engine having a pair of relatively moveable components that define a combustion chamber. An induction system is provided for delivering an air charge to the combustion chamber. An exhaust system is also employed for discharging a burnt charge from the combustion chamber. A fuel injector is employed that is positioned and operated so that it can selectively inject fuel directly into the combustion chamber or into the induction system for delivery to the combustion chamber. The fuel injector is controlled for injecting fuel into the induction system under one engine running condition and directly into the combustion chamber under another engine running condition.

BRIEF DESCRIPTION OF THE DRAWINGS

FIG. 2 is a cross-sectional view looking generally in a direction perpendicular to the plane about which FIG. 1 is taken and passing through the injector communication window in the piston.

DETAILED DESCRIPTION OF THE PREFERRED EMBODIMENTS OF THE INVENTION

Figure 1:
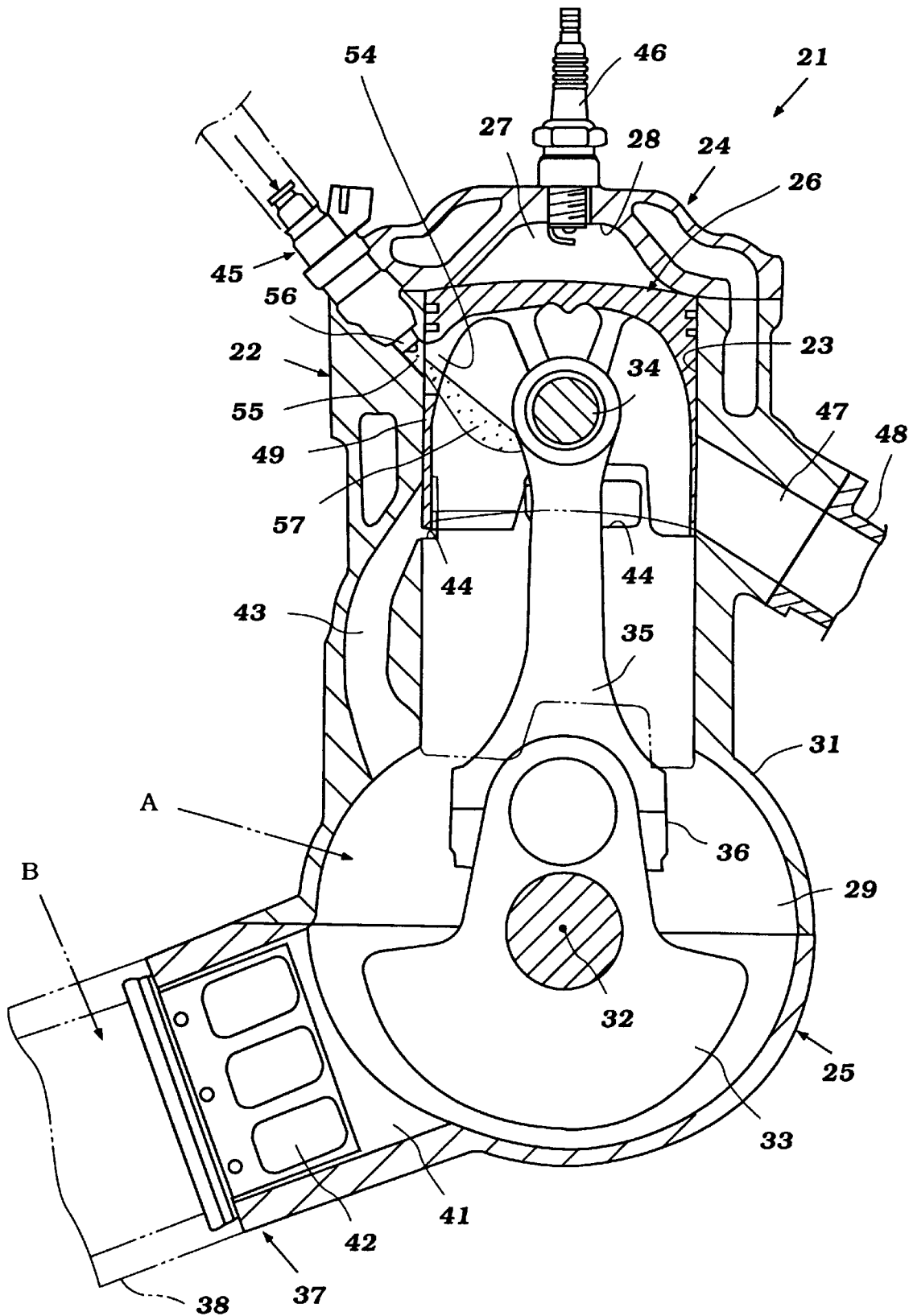
FIG. 1 is a cross-sectional view taken through the center of the cylinder of a single cylinder of an internal combustion engine constructed and operated in accordance with an embodiment of the invention.
Figure 2:
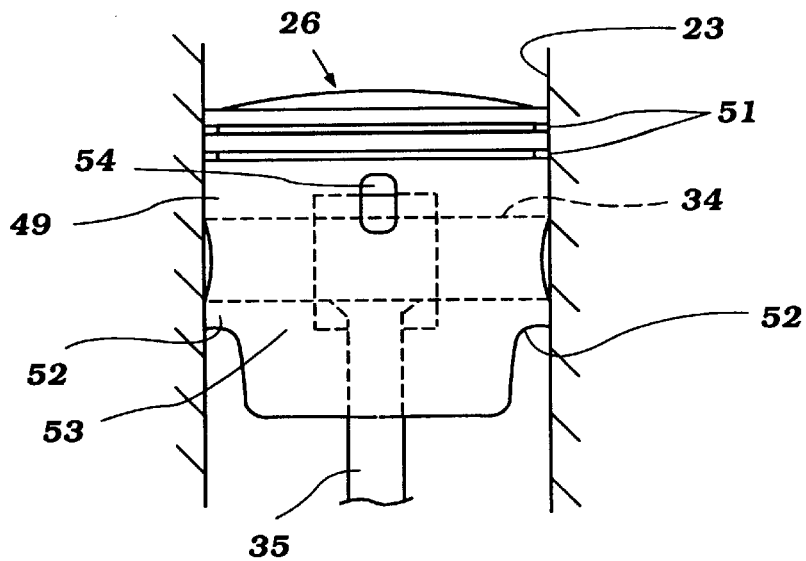

Referring now in detail to the drawings and initially to FIGS. 1 and 2, a two cycle, crankcase compression, internal combustion engine constructed and operated in accordance with an embodiment of the invention is identified generally by the reference numeral 21. In the drawings, only a single cylinder of the engine 21 is illustrated and will be described. It will be readily apparent to those skilled in the art how the invention can be employed with a wide variety of engine configurations varying from that illustrated in the number of cylinders and the orientation of the cylinders.

The engine 21 is comprised of a cylinder block assembly 22 that is formed with at least one cylinder bore 23. One end of the cylinder bore 23 is closed by a cylinder head assembly 24 that is affixed thereto in a suitable manner. The other end is closed by a crankcase member 25, which is also affixed to the cylinder block 22 in a suitable manner.

A piston 26 reciprocates in the cylinder bore 23 and divides the area above its head into a combustion chamber, indicated generally by the reference numeral 27 and which is formed in primary part by a recess 28 formed in the cylinder head assembly 24. The area below the piston 27 forms a crankcase chamber, indicated generally by the reference numeral 29, which is formed in primary part by a skirt 31 of the cylinder block 22 and the crankcase member 25.

If the engine 21 is of the multiple cylinder type, the crankcase chamber 29 associated with each cylinder bore 23 is sealed in an appropriate manner from the others to permit crankcase compression of the intake charge, as will be described.

The piston 26 drives a crankshaft, indicated generally by the reference numeral 32. The crankshaft 32 has balancing throws 33 and is supported for rotation in the crankcase chamber 29 in any manner known in the art. To this end, a piston pin 34 connects the upper end of a connecting rod 35 to the piston 26. The lower or big end of the connecting rod 35, indicated by the reference numeral 36, is journaled on the throw of the crankshaft 32.

An induction system is provided for delivering a charge to the crankcase chamber 29 and this induction system is shown in part and is identified generally by the reference numeral 37. This includes an air inlet device and which supplies air to an intake manifold, shown in phantom and indicated by the reference numeral 38. Atmospheric air is drawn through this system in a suitable manner and a throttle valve, which is not shown but which is indicated schematically in FIG. 3 by the reference numeral 39, controls the speed of the engine by controlling the air flow through this induction system 37.

The intake manifold 38 serves an intake port 41 formed in the crankcase member 25 through a reed type check valve 42. The intake port 41 communicates with the crankcase chamber 29 in a manner known in this art.

As the piston 26 moves upwardly within the cylinder bore 23, the volume of the crankcase chamber 29 will increase and an air charge will cause the reed type check valve 42 to open and enter the crankcase chamber 29. As the piston 26 moves downwardly in the cylinder bore 23, this charge will be compressed and the reed type check valve will prevent the compressed charge from escaping back through the induction system 37 to the atmosphere, as is well known in this art.

One or more scavenge passages 43 are formed in the cylinder block 22 and open at their lower or inlet ends into the crankcase chamber 29. The compressed charge is transferred through these scavenge passages 43 and into the combustion chamber 27 through scavenge ports 44 that are spaced around the axis of the cylinder bore 23 in a suitable orientation.

As the piston 26 continues its upward movement, the scavenge ports 44 will be closed and the transferred charge further compressed in the combustion chamber 27.

Fuel is supplied to the engine from a single fuel injector, indicated generally by the reference numeral 45 and which sprays in a manner to be described either into the crankcase chamber 29 and, accordingly, the induction system which includes the crankcase chamber 29 indicated at A and the induction system 37, indicated at B. The term "induction system" is utilized in the specification and claims as including these two volumes and the entire area between the atmospheric air inlet and the combustion chamber 27.

The formed fuel air mixture is then fired by a spark plug 46 so as to cause ignition of the fuel air mixture and burning in the combustion chamber 27. This drives the piston 26 downwardly and eventually an exhaust port which serves an exhaust passage 47 will be open so as to permit the exhaust gases to be discharged to the atmosphere through an exhaust system shown partially and indicated by the reference numeral 48.

The described cycle of operation is basically the same as conventional two cycle engines and, for that reason, further description of the basic structure of the engine 21 is not believed to be necessary to permit those skilled in the art to practice the invention.

As may be best seen in FIG. 2, the piston 26 is comprised of a head portion 49 in which ring grooves are formed that receive piston rings 51 for sealing and oil control purposes.

The piston pin 34 is received in boss portions 52 that are formed below the head portion 49 and which merge into skirt portions 53 that engage the cylinder bore 23 for the sliding support of the piston along with the operation of the piston rings 51.

In this embodiment, the head portion 49 and possibly upper portions of the skirt portion 53 are provided with an injection window 54 that passes through the piston 26 from its exterior surface into the interior surface as best seen in FIG. 1.

It will be seen that the cylinder block 22 is formed with an injector port 55 which opens through the cylinder bore 23 and which receives the nozzle portion 56 of the injector 45. The cylinder block opening 55 is slightly less in height than the height of the piston window 54 but circumferentially aligned with it so as to provide a period when the injector nozzle 56 communicates with the induction system and specifically the crankcase chamber 29 through the piston. This spray condition is shown in FIG. 1 and thus permits the fuel injector, at these times, to spray all of the injected fuel into the crankcase chamber or induction system. This spray path is indicated at 57 in FIG. 1.

At other times and as will become apparent, the piston head 49 is disposed below the injector port 55 in the cylinder block so that the injector 45 may spray directly into the combustion chamber 27.

Figure 3:
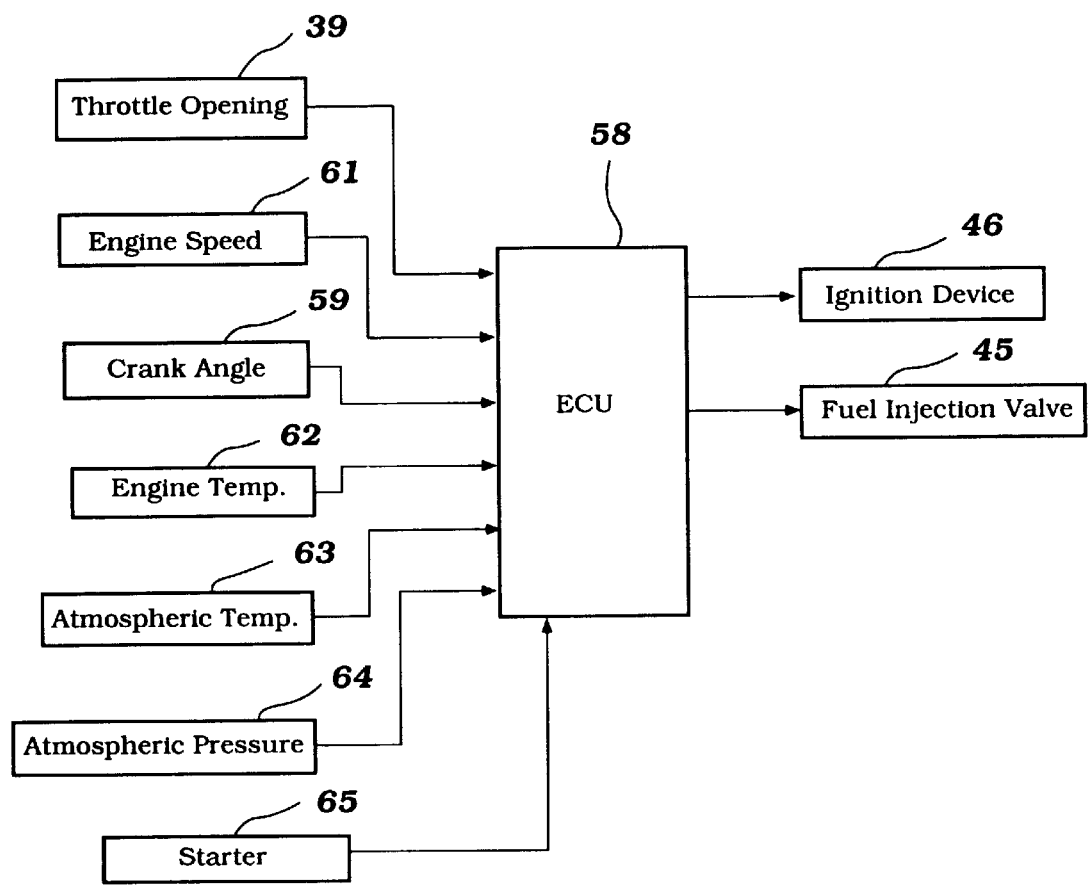
FIG. 3 is partially schematic block diagram showing the various components of the fuel injection control system and ignition control system.

Before describing the control strategy, those components that are associated with it will be described by reference to FIG. 3.

The fuel injector 45 and spark plug 46 are operated with a suitable control strategy programmed into an ECU, indicated generally by the reference numeral 58. This control strategy requires the sensing of a certain engine conditions and certain sensors for this purpose are illustrated in FIG. 3.

As has been previously indicated, the induction system includes a throttle valve 39 which has associated with it a sensor that outputs a signal to the ECU 58 indicative of throttle position and, accordingly, operator load or demand.

A crank angle sensor 59 is associated with the crankshaft 32 and outputs a signal indicative of crank angle position. This signal may also employed in conjunction with a timer so as to provide an output signal indicative of engine speed, indicated by the block 61 in FIG. 3.

Other conditions may be sensed such as engine temperature 62 atmospheric temperature 63 and atmospheric pressure 64.

The engine also may be provided with an electric starter and there is a further sensor that indicates when starting operation is initiated and this is indicated at 65.

Figure 4:
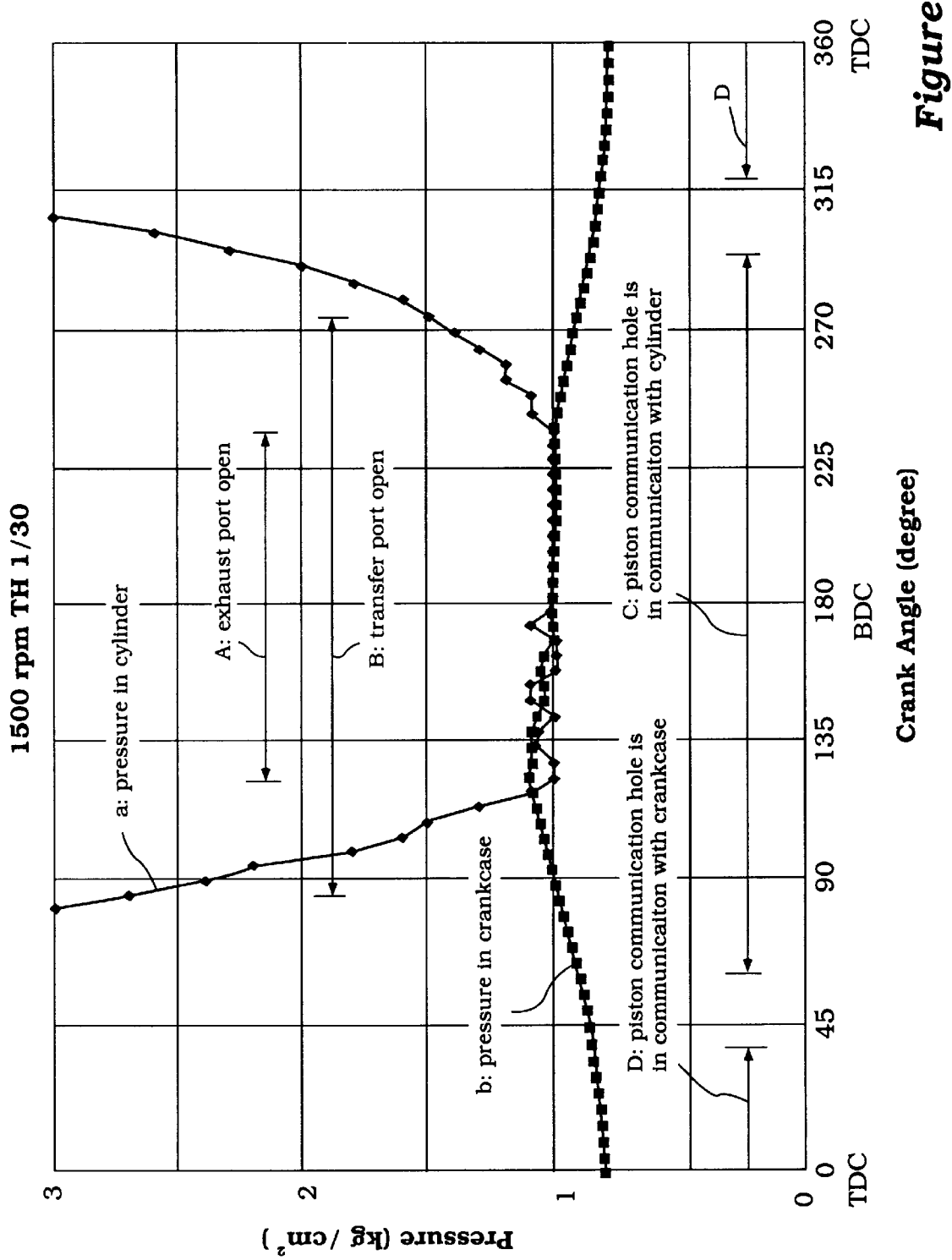
FIG. 4 is a timing diagram showing the various position of the piston during its stroke, the pressure the crankcase chamber, the pressure in the cylinder and the port timing in order to explain the injection strategy.
Figure 5:
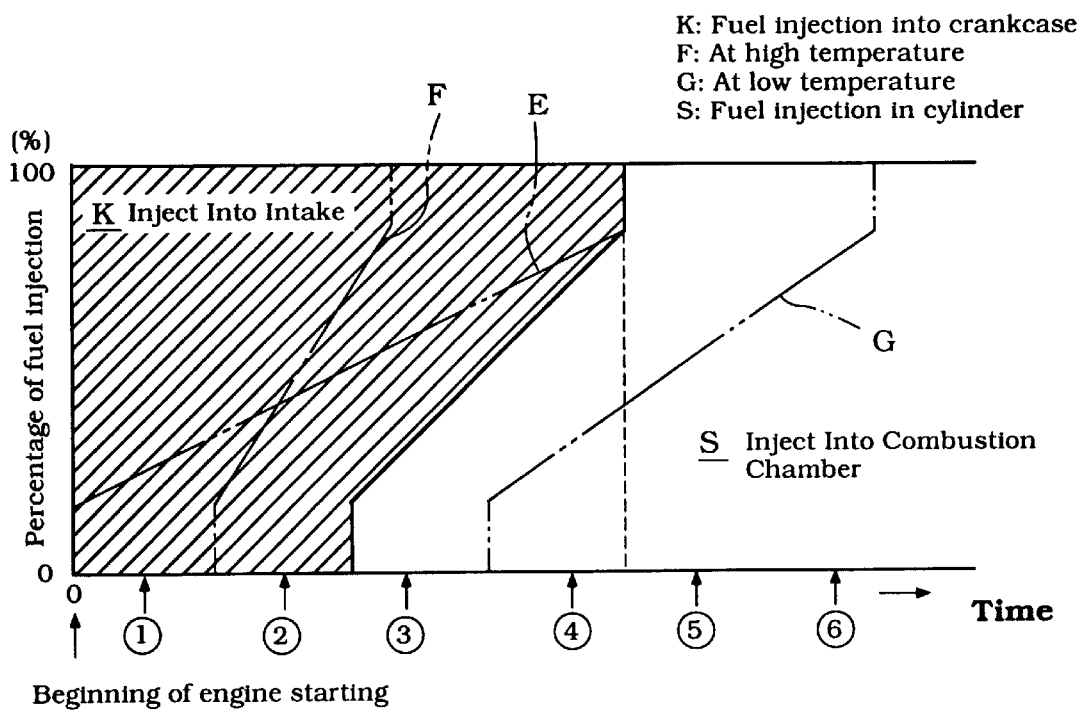
FIG. 5 is timing view showing the amount of fuel injection during starting of the engine and the injection location when starting cold.
Figure 6:
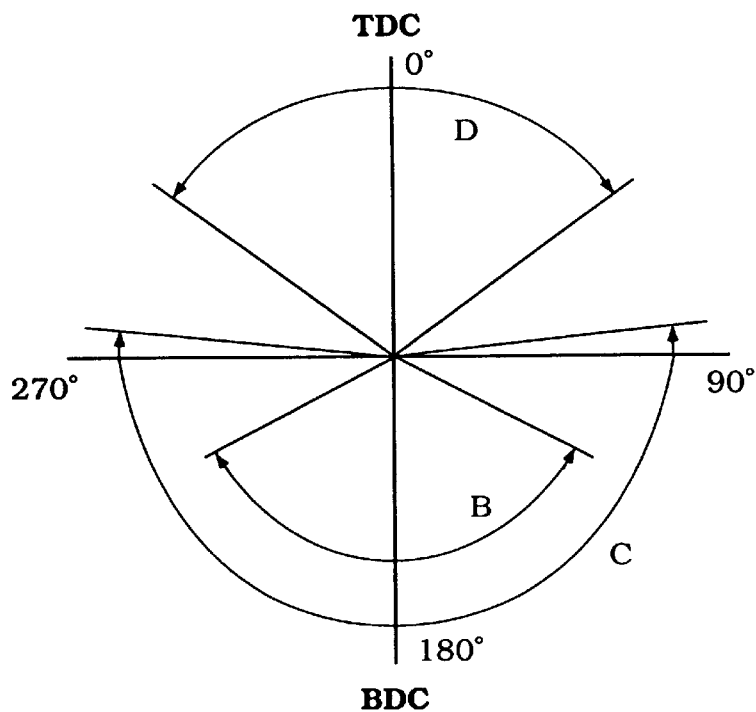
FIG. 6 is a timing diagram showing the various timing conditions in connection with the engine operation and specifically the two ranges in which fuel may be injected either directly into the combustion chamber or directly into the induction system and the transition therebetween.

The timing associated with the opening and closing of the scavenge ports 44 and the exhaust port that communicates with the exhaust passage 47 and the communication of the fuel injector nozzle 56 with either the combustion chamber 27 or the induction system and specifically the crankcase chamber 29 will now be described primarily by reference to FIG. 4.

As may be seen when the piston moves from its top dead center position, indicated at TDC, toward bottom dead center (BDC) at a point at approximately 85° after top dead center, the piston head 49 will clear the top edge of the scavenge passages 44 and they will open as indicated by the curve portion B.

As the piston 26 continues its down stroke, at a point at approximately 120° after top dead center, the exhaust port will open to communicate with the exhaust passage 47 as indicated by the line A. Thus, both ports are open as the piston passes bottom dead center and continues upwardly until at approximately 240° after top dead center, the exhaust port which communicates with the exhaust passage 47 will close. The scavenge ports close some time later at approximately 380° after top dead center.

As may be seen from the curve A when the exhaust ports close, the pressure in the combustion chamber 27 which has been fairly stable during the time when the exhaust port is open will begin to rise. This rise in pressure continues up until the spark plug is fired at which time the pressure then arises even more abruptly. The pressure then drops off as the piston expands and once the exhaust port opens falls quite rapidly and maintains at a low pressure.

Continuing to refer to this figure, when the piston 26 is at its top dead center position, the window 54 will be in communication with the cylinder block port 55 and fuel can be sprayed directly into the combustion chamber. This condition is maintained until about 40° after top dead center at which time the downward movement of the piston closes the window 56 from communication with the cylinder block port 55.

At some time later and when the piston continues its downward movement, the head 49 of the piston 26 will clear the port 55 and the injector may then spray into the combustion chamber directly as indicated by the curve C. This happens at approximately 60° after top dead center and continues until about 300° before top dead center. There is then a time period before the injector port 55 communicates again with the window 54 at about 320° after top dead center as indicated by the curve D.

The control operation will now be described by primary reference to FIGS. 5–12. Basically, the strategy is when the engine is being started and particularly when it is at low temperature, the initial injection of fuel takes place into the crankcase chamber 29 or more generally the induction system rather than into the combustion chamber 27. This has a number of advantages.

First, because the crankcase chamber pressure is less than atmospheric at almost all times, the difference between the pressure of the fuel and the pressure where the fuel is being injected is greater and more fuel can be injected in less time. Second, because the pressure difference is greater this increases the vaporization of the fuel. Finally, since the fuel must pass from the crankcase chamber 29 into the combustion chamber 27 through the scavenge passages 43, there is even further time for fuel vaporization and this is aided by the air flow.

Figure 7:
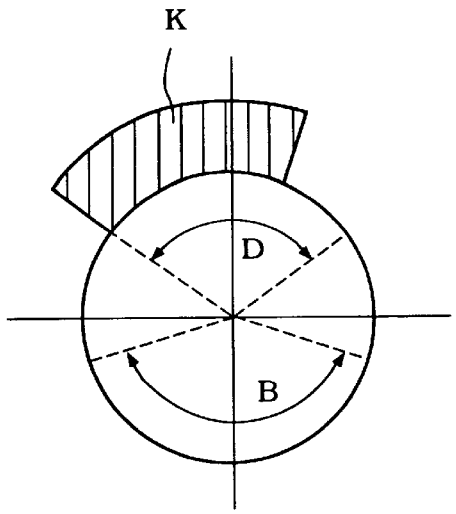
FIGS. 7–12 are views showing the injection pattern at the points 1–6, respectively in FIG. 5 to show the injection timing and strategy for assisting in starting.
Figure 8:
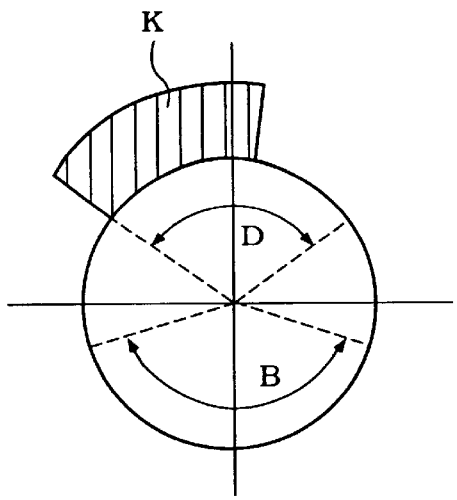
Figure 9:
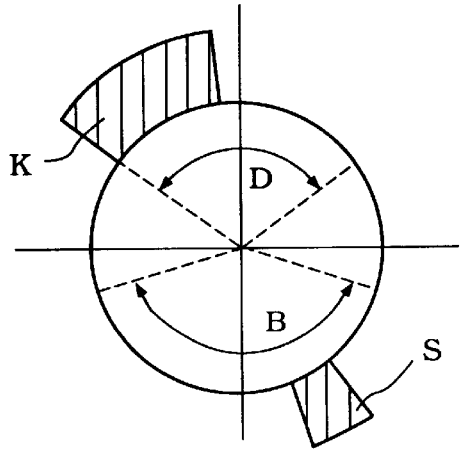
Figure 10:
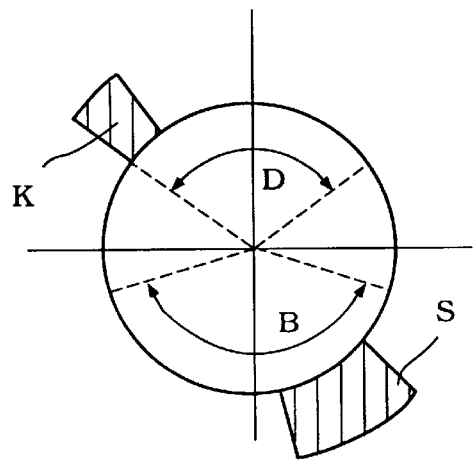
Figure 11:
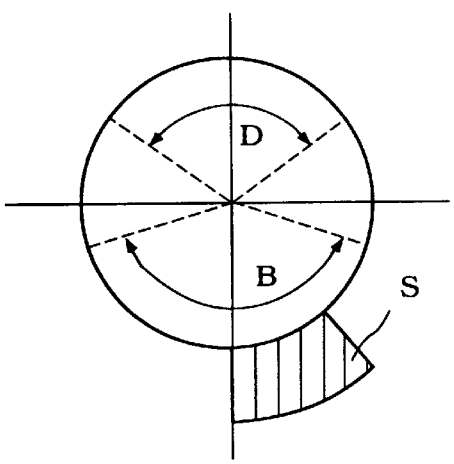
Figure 12:
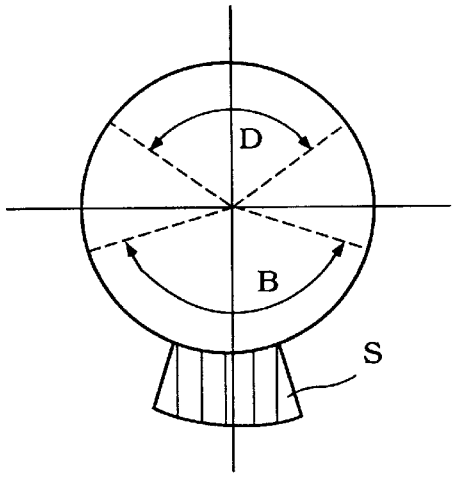

However, as the engine begins to run and during subsequent cycles, then the fuel injection is switched over so as to occur in decreasing amounts into the crankcase chamber as seen in FIGS. 7 and 8 and eventually to progressively increase the amount of fuel that is injected directly into the combustion chamber 27 as seen in FIGS. 9 and 10.

Finally, as the engine begins to run and warm up, all of the injection takes place directly into the combustion chamber 27. Initially, the fuel injection time is set so as to begin sometime after the scavenge ports are open and to retard this injection duration time closer to the time when the exhaust ports open as the temperature increases. This is done so as to decrease the time that the fuel remains in the combustion chamber for vaporization and to ensure against fuel escapade out of the open exhaust ports.

The switch over time depends on a combination of time and temperature and begins at the time t1 and ends at the time t2. As may be seen, these curves are shifted to occur sooner at high temperatures and later at low temperatures.

Thus, the described invention provides very good control of fuel injection and reduces the cost of the fuel injectors as well as the number of them and simplifies the fuel delivery system as well as the pumping and regulation required. A single fuel injector can operate either as a direct injector or a manifold injector depending upon the running conditions of the engine. Of course, the foregoing description is that of a preferred embodiment of the invention and various changes and modifications can be made without departing from the spirit and scope of the invention, as defined by the appended claims.

What is claimed is:

1. An internal combustion engine having a pair of relatively moveable components defining a combustion chamber, an induction system for delivering an air charge to said combustion chamber, an exhaust system for discharging a burnt charge from said combustion chamber, a fuel injector positioned and operated so that it can selectively inject fuel directly into said combustion chamber or into said induction system for delivery thereby to said combustion chamber, and a control for said fuel injector for injecting fuel only into said induction system under on e engine running condition for deliver therethrough to said combustion chamber and only directly into said combustion chamber under another engine running condition.

2. An internal combustion engine as set forth in claim 1, wherein the condition when the fuel is injected only into the induction system is selected from the group of startup and low engine temperature.

3. An internal combustion engine as set forth in claim 1, wherein the engine is a two cycle crankcase compression engine and the induction system includes the crankcase chamber and an induction system for delivering air to the crankcase chamber.

4. An internal combustion engine as set forth in claim 3, wherein the fuel injector injects fuel into the induction system at the crankcase chamber.

5. An internal combustion engine as set forth in claim 1, wherein the fuel injector is mounted so as to inject through the cylinder bore formed by one of the members of the engine and wherein the other member comprises a piston having a window through which the fuel injector can communicate with the induction system under certain positions of said piston in said cylinder bore.

6. An internal combustion engine as set forth in claim 5, wherein the engine is a two cycle crankcase compression engine and the induction system includes the crankcase chamber and an induction system for delivering air to the crankcase chamber.

7. An internal combustion engine as set forth in claim 6, wherein the induction system terminates at at least one scavenge port opened and closed by the movement of the piston and the exhaust system originates at at least one exhaust port opened and closed by the movement of said piston.

8. An internal combustion engine as set forth in claim 7, wherein the condition when the fuel is injected only into the induction system is selected from the group of startup and low engine temperature.

9. An internal combustion engine as set forth in claim 8, wherein the engine is a two cycle crankcase compression engine and the induction system includes the crankcase chamber and an induction system for delivering air to the crankcase chamber.

10. An internal combustion engine as set forth in claim 9, wherein the fuel injector injects fuel into the induction system at the crankcase chamber.

11. An internal combustion engine as set forth in claim 10, wherein the fuel injector injects fuel into both the induction system and directly into the combustion chamber under engine running condition between the one and the other running conditions.

* * * * *